United States Patent
Kiriyama et al.

(10) Patent No.: US 9,796,590 B2
(45) Date of Patent: Oct. 24, 2017

(54) CARBON FIBER MANUFACTURING METHOD AND CARBON FIBER

(75) Inventors: Takayuki Kiriyama, Toyohashi (JP); Masahiro Hata, Toyohashi (JP); Hiroyuki Nakao, Otake (JP); Nobuyuki Yamamoto, Toyohashi (JP); Masashi Shimahara, Toyohashi (JP); Kenichi Watanabe, Toyohashi (JP); Yasunori Murano, Toyohashi (JP); Hiroshi Tategaki, Toyohashi (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 14/235,494

(22) PCT Filed: Aug. 2, 2012

(86) PCT No.: PCT/JP2012/069682
§ 371 (c)(1),
(2), (4) Date: Jan. 28, 2014

(87) PCT Pub. No.: WO2013/018860
PCT Pub. Date: Feb. 7, 2013

(65) Prior Publication Data
US 2014/0234199 A1 Aug. 21, 2014

(30) Foreign Application Priority Data
Aug. 2, 2011 (JP) .................. 2011-169273

(51) Int. Cl.
*C01B 31/02* (2006.01)
*D06M 11/34* (2006.01)
(Continued)

(52) U.S. Cl.
CPC ............ *C01B 31/02* (2013.01); *D01F 11/122* (2013.01); *D06M 11/34* (2013.01); *D06M 23/06* (2013.01);
(Continued)

(58) Field of Classification Search
CPC ...................................... C01B 31/02
(Continued)

(56) References Cited

U.S. PATENT DOCUMENTS

2003/0194506 A1* 10/2003 Drzal et al. .................. 427/553
2012/0003143 A1 1/2012 Nishiwaki et al.

FOREIGN PATENT DOCUMENTS

GB  2 161 273 A  1/1986
JP  60-246864 A  12/1985
(Continued)

OTHER PUBLICATIONS

European Search Report issued in European Patent Application No. 12819766.2 on Jun. 25, 2014.
(Continued)

*Primary Examiner* — Brian Walck
(74) *Attorney, Agent, or Firm* — Morgan, Lewis & Bockius LLP

(57) ABSTRACT

Provided is a carbon fiber manufacturing method including a surface treatment step of ejecting an ozone solution in which ozone is dissolved in solvent from a fluid ejecting port toward a carbon fiber bundle and causing the ozone solution to pass between single fibers of the carbon fiber bundle so as to contact surfaces of the single fibers so that the surfaces of carbon fibers are treated by the ozone solution. Also, provided is a carbon fiber subjected to a surface treatment by the carbon fiber manufacturing method.

12 Claims, 3 Drawing Sheets

(51) Int. Cl.
*D06M 23/06* (2006.01)
*D01F 11/12* (2006.01)
*D06M 101/40* (2006.01)

(52) U.S. Cl.
CPC .... *D06M 2101/40* (2013.01); *D06M 2200/50* (2013.01)

(58) Field of Classification Search
USPC .................................. 423/447.1, 447.2, 460
See application file for complete search history.

(56) References Cited

FOREIGN PATENT DOCUMENTS

| | | |
|---|---|---|
| JP | 62-263375 A | 11/1987 |
| JP | 10-072762 A | 3/1998 |
| JP | 2000-154460 A | 6/2000 |
| JP | 2001-164460 A | 6/2001 |
| JP | 2001-169273 A | 6/2001 |
| JP | 2001-207377 A | 8/2001 |
| JP | 2009-079344 A | 4/2009 |
| JP | 2012-031559 A | 2/2012 |
| WO | 2004/043614 A1 | 5/2004 |

OTHER PUBLICATIONS

International Search Report dated Oct. 2, 2012 for International application No. PCT/JP2012/069682.

* cited by examiner

CARBON FIBER MANUFACTURING METHOD AND CARBON FIBER

TECHNICAL FIELD

The present invention relates to a carbon fiber manufacturing method and a carbon fiber.

Priority is claimed on Japanese Patent Application No. 2011-169273 filed on Aug. 2, 2011, the content of which is incorporated herein by reference.

BACKGROUND ART

Carbon fibers are greatly useful for an aerospace material, a sports material, a leisure material, and an industrial material for a pressure container or the like due to the excellent mechanical strength thereof and are demanded in many fields. Further, it is expected that carbon fibers are used for a broad field in the future.

In general, the carbon fibers are manufactured by carbonizing a carbon fiber precursor fiber bundle, obtained by binding a precursor fiber of a carbon fiber such as a polyacrylonitrile fiber, at a high temperature. Specifically, the carbon fiber precursor fiber bundle is subjected to a heating treatment (a flame-resistant treatment) in a flame-resistant furnace filled with an oxidization atmosphere so as to obtain a flame-resistant fiber bundle, and the obtained flame-resistant fiber bundle is subjected to a heating treatment (a pre-carbonizing treatment and a carbonizing treatment) in a carbonizing furnace filled with an inert atmosphere such as nitrogen so as to obtain a carbon fiber.

In general, the carbon fiber is not directly used, and is formed as a composite material by the combination with a matrix resin so as to be used for various applications.

However, when the wettability, the compatibility, and the adhesiveness of the carbon fiber and the matrix resin are not sufficient, it is difficult to obtain satisfactory properties when the carbon fiber is used as a composite material.

For this reason, a surface treatment is generally performed on the carbon fiber subjected to the heating treatment in the inert atmosphere so as to modify the surface of the carbon fiber and a sizing treatment is further performed thereon, whereby the wettability, the compatibility, and the adhesiveness with respect to the matrix resin are improved.

As a method of performing the surface treatment on the carbon fiber, there is known an electrolytic oxidation treatment method, a liquid-phase oxidization treatment such as a chemical oxidization treatment, or a gas-phase oxidization treatment. When the oxidization treatment is performed on the surface of the carbon fiber, an oxygen-containing functional group is formed on the surface of the fiber, and hence the wettability, the compatibility, and the adhesiveness with respect to the matrix resin are improved. Furthermore, the carbon fiber subjected to the oxidization treatment is generally subjected to a sizing treatment by a sizing agent after the carbon fiber is dried inside a dryer or the like.

Even in such an oxidization treatment, particularly the electrolytic oxidation treatment is a surface treatment method that is practical and effective compared to the chemical oxidization treatment or the gas-phase oxidization treatment from the viewpoint of the easiness of the treatment, the easiness of the treatment condition control, and the easiness of the introduction of the oxygen-containing functional group with respect to the carbon fiber surface.

However, in the electrolytic oxidation treatment method, there is a need to clean the electrolytic solution adhering to the carbon fiber after the electrolytic oxidation treatment by pure water or the like. As a result, the manufacturing apparatus may increase in size or the manufacturing cost may increase.

Further, when drying the cleaned carbon fiber, there is a need to dry the carbon fiber at a temperature equal to the boiling point of solvent used in the electrolytic solution or higher than the boiling point thereof in consideration of the electrolytic solution that remains after the cleaning treatment. Since sulfuric acid or nitric acid is generally used in the electrolytic solution, there is a need to use a high-temperature dryer capable of setting a temperature equal to the boiling point thereof, and the manufacturing cost easily increases.

Further, when the electrolytic solution used for the electrolytic oxidation treatment is directly drained, environmental burden increases. For this reason, there is a need to perform a waste liquid treatment such as a neutralization treatment so as to prevent the environmental burden. As a result, the productivity is degraded, and the manufacturing cost easily increases. Since the cleaning waste liquid having been used to clean the carbon fiber after the electrolytic oxidation treatment contains the electrolytic solution, the same problem occurs even when the cleaning waste liquid is drained.

Therefore, as a carbon fiber surface treatment method that does not require a cleaning process, is convenient in operation, and reduces manufacturing cost, for example, Patent Document 1 discloses a method of treating a surface of a carbon fiber by immersing or transporting the carbon fiber into or inside an ozone solution obtained by dissolving ozone.

CITATION LIST

Patent Document

Patent Document 1: JP 2009-79344 A

DISCLOSURE OF THE INVENTION

Problem to be Solved by the Invention

However, in a case where the carbon fiber subjected to the surface treatment by the method of Patent Document 1 is used as a composite material, the adhesiveness with respect to the matrix resin is not always sufficient.

The invention is made in view of the above-described circumstances, and an object of the invention is to provide a carbon fiber manufacturing method capable of obtaining a carbon fiber having excellent adhesiveness with respect to a matrix resin and to provide a carbon fiber.

Means for Solving Problem

The invention includes the following aspects.

(1) A carbon fiber manufacturing method including: a surface treatment step of ejecting an ozone solution in which ozone is dissolved in solvent from a fluid ejecting port toward a carbon fiber bundle and causing the ozone solution to pass between single fibers of the carbon fiber bundle so as to contact surfaces of the single fibers so that the surfaces of carbon fibers are treated by the ozone solution.

(2) The carbon fiber manufacturing method according to (1), wherein a tension of the carbon fiber bundle measured when the ozone solution contacts surfaces of single fibers is 0.3 kg to 1.8 kg for twelve thousand single fibers.

(3) The carbon fiber manufacturing method according to (1) or (2), wherein the carbon fiber bundle is held inside the ozone solution for 0.1 seconds to 60 seconds.

(4) The carbon fiber manufacturing method according to any one of (1) to (3), wherein the ozone solution is ejected in a direction intersecting the transportation direction of the transported carbon fiber bundle, an ejection amount of the ozone solution per unit time is set to forty times to three hundred times with respect to a mass of the carbon fiber bundle passing above the fluid ejecting port or below the fluid ejecting port per unit time, and an ejection speed of the ozone solution is set to 0.20 m/second to 2.0 m/second.

(5) The carbon fiber manufacturing method according to any one of (1) to (4), wherein the number of times of ejecting the ozone solution from the fluid ejecting port toward the carbon fiber bundle so as to contact the surfaces of the single fibers is set to one to four times.

(6) The carbon fiber manufacturing method according to any one of (1) to (5), wherein the fluid ejecting port has a rectangular shape, the length direction of the fluid ejecting port is the width direction of the carbon fiber bundle, and a length of the fluid ejecting port in the length direction is equal to or larger than a width of the carbon fiber bundle.

(7) The carbon fiber manufacturing method according to any one of (1) to (6), wherein a collision plate is installed at a position facing the fluid ejecting port by interposing the carbon fiber bundle transported above a liquid level of an ozone treatment tank storing the ozone solution, and the ozone solution ejected from the fluid ejecting port is caused to pass between the single fibers of the carbon fiber bundle so as to collide with the collision plate.

(8) The carbon fiber manufacturing method according to any one of (1) to (7), wherein the surface treatment is performed on the carbon fiber bundle of which the permeation resistance measured based on JIS P 8117:2009 is 100 seconds to 700 seconds and which is transported above the liquid level of the ozone treatment tank storing the ozone solution.

(9) The carbon fiber manufacturing method according to any one of (1) to (8), wherein the surface treatment is performed on the carbon fiber bundle of which the moisture content is 40% or less and which is transported above the liquid level of the ozone treatment tank storing the ozone solution.

(10) The carbon fiber manufacturing method according to any one of (1) to (6), wherein the surface treatment is performed on the carbon fiber bundle transported inside the ozone solution.

(11) The carbon fiber manufacturing method according to any one of (1) to (10), wherein an ozone concentration of the ozone solution is 10 mg/L to 120 mg/L.

(12) The carbon fiber manufacturing method according to any one of (1) to (11), wherein the number of the single fibers of the carbon fiber bundle is 10000 to 60000.

(13) The carbon fiber manufacturing method according to any one of (1) to (12), wherein a carbon fiber is obtained of which a current value (ipa value) per unit area measured by a cyclic voltammetry method is 0.10 $\mu A/cm^2$ or more.

(14) A carbon fiber that is subjected to a surface treatment by the carbon fiber manufacturing method according to any one of (1) to (13), wherein a current value (ipa value) per unit area measured by a cyclic voltammetry method is 0.10 $\mu A/cm^2$ or more.

Effect of the Invention

According to the carbon fiber manufacturing method of the invention, it is possible to obtain the carbon fiber having excellent adhesiveness with respect to the matrix resin.

Further, the carbon fiber of the invention has excellent adhesiveness with respect to the matrix resin.

EFFECT OF THE INVENTION

BEST MODE(S) FOR CARRYING OUT THE INVENTION

Figure 1:
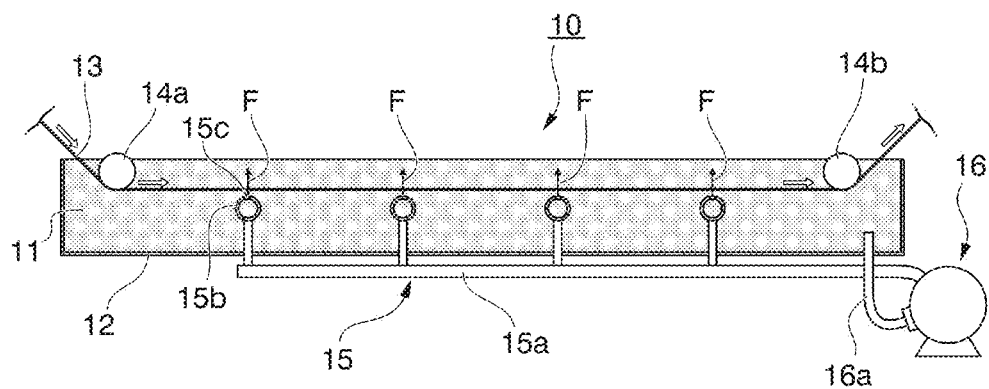
FIG. 1 is a front view schematically illustrating an example of a surface treatment apparatus that is used in a surface treatment for a carbon fiber.

Hereinafter, the invention will be described in detail.

A carbon fiber manufacturing method of the invention includes a surface treatment step of ejecting an ozone solution in which ozone is dissolved in solvent from a fluid ejecting port toward a carbon fiber bundle and causing the ozone solution to pass between single fibers of the carbon fiber bundle so as to contact surfaces of the single fibers so that the surfaces of carbon fibers are treated by the ozone solution.

The ozone solution may be ejected toward the stopped carbon fiber bundle or may be ejected toward the transported carbon fiber bundle, but it is desirable to eject the ozone solution toward the transported carbon fiber bundle from the viewpoint of uniformly ejecting the ozone solution.

As a surface treatment operation method, for example, a surface treatment may be performed in a manner such that a carbon fiber manufactured with an untreated surface or a carbon fiber sold in a market with an untreated surface is prepared and such a carbon fiber bundle is transported inside a container filled with an ozone solution at a necessary time or a surface treatment may be performed in a manner such that a firing treatment (carbonizing treatment) to be described later is performed and a carbon fiber bundle is transported inside an ozone solution. In the latter operation method, since the carbon fiber may be continuously manufactured, the productivity may be further improved.

Hereinafter, an example of a method (a carbon fiber surface treatment method) of treating a surface of a carbon fiber by an ozone solution will be described with reference to FIGS. 1 and 2 by exemplifying a case in which an ozone solution is ejected toward a transported carbon fiber bundle. Furthermore, in FIGS. 3 to 8 to be described below, the same reference numerals will be given to the same components as those of FIGS. 1 and 2, and the description thereof will not be repeated.

<Carbon Fiber Surface Treatment Method>

Figure 2:
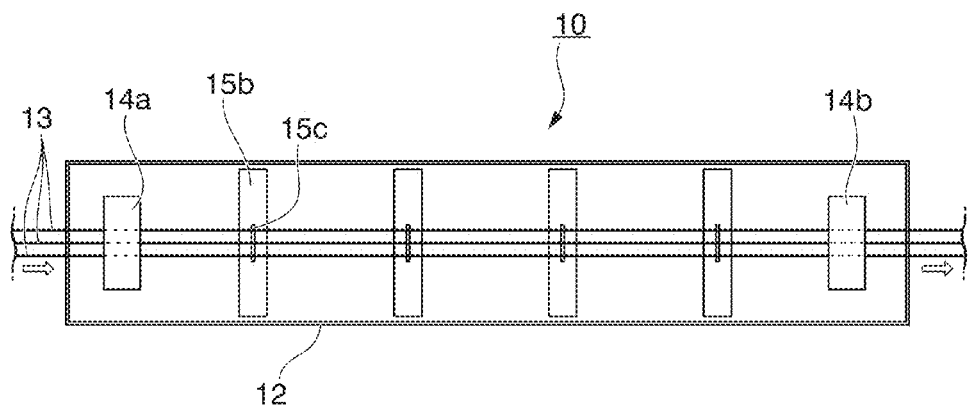
FIG. 2 is a top view illustrating the surface treatment apparatus of FIG. 1.

FIG. 1 is a front view schematically illustrating an example of a surface treatment apparatus that treats a surface of a carbon fiber, and FIG. 2 is a top view illustrating the surface treatment apparatus of FIG. 1. A surface treatment apparatus 10 of this example includes an ozone treatment tank 12 that stores an ozone solution 11, a first free roll 14a that guides a transported carbon fiber bundle 13 into the ozone treatment tank 12, a second free roll 14b that guides the carbon fiber bundle 13 to the outside of the ozone treatment tank 12, a contact member 15 that causes the ozone solution 11 to contact the carbon fiber bundle 13, and a circulation pump 16 that circulates the ozone solution 11.

Furthermore, in FIG. 2, the ozone solution 11 and the circulation pump 16 will not be described together with a pipe 15a and a suction pipe 16a to be described later.

The ozone solution 11 is a solution in which ozone is dissolved in solvent. For example, the ozone solution 11 may be obtained by dissolving an ozone gas generated from an ozone generator (not illustrated) using an ozone gas dissolving device (not illustrated).

As the solvent that dissolves ozone, water, a solution used for liquid-phase oxidation, and the like may be exemplified. Among these examples, water is desirable, and particularly, pure water such as distilled water or deionized water obtained by reducing impurities is desirable.

As the ozone generator or the ozone gas dissolving device, a commercial product may be used.

The ozone treatment tank 12 is used to store the ozone solution 11 supplied from an ozone gas dissolving device (not illustrated).

The first free roll 14a is used to guide the transported carbon fiber bundle 13 into the ozone treatment tank 12.

The second free roll 14b is used to guide the carbon fiber bundle 13 of which the surface is treated by the contact of the ozone solution 11 to the outside of the ozone treatment tank 12.

The contact member 15 is used for the contact of the ozone solution 11 with respect to the carbon fiber bundle 13. The contact member 15 of this example includes a pipe 15a that is installed below the ozone treatment tank 12 and four branch pipes 15b that are branched from the pipe 15a.

The pipe 15a is disposed so that its length direction is parallel to the transportation direction of the carbon fiber bundle 13, and one end thereof is connected to the circulation pump 16 so that the ozone solution 11 is supplied thereinto by the circulation pump 16.

The branch pipes 15b are elongated pipes, and are branched from the pipe 15a so that the length directions thereof intersect the length direction of the pipe 15a (that is, the length directions of the branch pipes 15b are perpendicular to the transportation direction of the carbon fiber bundle 13) as illustrated in FIG. 2. Further, the branch pipes 15b are formed so that a rectangular fluid ejecting port 15c formed at each upper side of the branch pipe follows the length direction of the branch pipe 15b (that is, the length direction of the fluid ejecting port 15c becomes the width direction of the carbon fiber bundle 13, so that the ozone solution 11 that is supplied to the branch pipe 15b through the pipe 15a is ejected from the fluid ejecting port 15c toward the carbon fiber bundle 13 transported inside the ozone treatment tank 12.

It is desirable that the length of the fluid ejecting port in the length direction be equal to or larger than the width of the carbon fiber bundle.

The circulation pump 16 is used to suction the ozone solution 11 inside the ozone treatment tank 12 by the suction pipe 16a and to supply the ozone solution into the pipe 15a of the contact member 15.

In the carbon fiber surface treatment method using the surface treatment apparatus 10 illustrated in FIG. 1, the carbon fiber bundle 13 is first immersed into the ozone solution 11 through the first free roll 14a with respect to the ozone treatment tank 12 filled with the ozone solution 11. Then, the ozone solution 11 is ejected from the fluid ejecting port 15c of the contact member 15 toward the carbon fiber bundle 13 transported inside the ozone solution in a direction intersecting the transportation direction of the carbon fiber bundle 13, and the ozone solution 11 is caused to pass between the single fibers of the carbon fiber bundle 13 so as to contact the surfaces of the single fibers. The movement direction F of the ozone solution 11 at this time is a direction that is upwardly perpendicular to the transportation direction of the carbon fiber bundle 13 (that is, a direction from the lower side of the horizontal carbon fiber bundle 13 toward the upside thereof).

Next, the carbon fiber bundle 13 of which the surface is treated by the contact with the ozone solution 11 is guided to the outside of the ozone solution 11 of the ozone treatment tank 12 by the second free roll 14b.

When the ozone solution 11 is ejected in a direction intersecting the transportation direction of the carbon fiber bundle 13, the ozone solution 11 may easily pass between the single fibers of the carbon fiber bundle 13, so that the ozone solution 11 may be easily dispersed into carbon fiber bundle 13. When the ozone solution 11 is dispersed into carbon fiber bundle 13, the number of the oxygen-containing functional groups on the surfaces of the single fibers may easily and uniformly increase until the ozone solution reaches the inside of the carbon fiber bundle 13. Thus, the carbon fiber subjected to the surface treatment in the invention has excellent adhesiveness with respect to a matrix resin when the carbon fiber is used as a composite material.

Furthermore, the ozone solution movement direction of the invention indicates a direction in which the ozone solution ejected from the fluid ejecting port or the naturally dropped ozone solution flows.

Here, the lower-limit value of the dissolved ozone concentration (hereinafter, the "ozone concentration") inside the ozone solution is desirably 10 mg/L or more, more desirably 20 mg/L or more, and most desirably 30 mg/L or more from the viewpoint of efficiently performing the carbon fiber surface treatment. Further, the upper-limit value of the dissolved ozone concentration is desirably 120 mg/L or less, more desirably 80 mg/L or less, and most desirably 50 mg/L or less from the viewpoint of the manufacturing cost of the ozone solution.

The ozone concentration may be adjusted by the ozone gas concentration, the ozone solution temperature, or the like. For example, when the concentration of the ozone gas is increased or the temperature of the ozone solution is decreased, there is a tendency that the ozone concentration increases.

Further, the treatment temperature at which the surface of the carbon fiber is treated is not particularly limited. However, the ozone ($O_3$) dissolved in the solution changes to oxygen ($O_2$) or the ozone is discharged from the ozone solution to external air as the treatment temperature increases, and hence there is a tendency that the surface treatment efficiency is degraded. For this reason, the ozone solution the temperature is desirably 0 to 40° C., and is more desirably 5 to 25° C.

It is desirable that the number of times (the number of contact times) of causing the ozone solution 11 ejected from the fluid ejecting port 15c toward the carbon fiber bundle 13 to contact the surfaces of the single fibers be one to four times. When the number of contact times of the ozone solution 11 by the ejection toward the carbon fiber bundle 13 is zero (that is, the ozone solution 11 is not ejected to the carbon fiber bundle 13), the ozone solution 11 may not easily dispersed into the carbon fiber bundle 13. As a result, the surface treatment is not sufficiently performed on the single fibers inside the carbon fiber bundle 13, and hence the adhesiveness between the carbon fiber and the matrix resin is degraded. Meanwhile, when the number of contact times exceeds four times, the more surface treatment effect may not be obtained, and the cost of the surface treatment may easily increase. Thus, it is desirable that the number of contact times be four times or less in order to efficiently treat the surface of the carbon fiber from the viewpoint of economy.

Furthermore, the number of contact times of the invention is the number of times of causing the ozone solution to be ejected from an arbitrary position of the carbon fiber bundle 13 so that the ozone solution passes between the single fibers. For example, the number of contact times is four times when the surface treatment apparatus 10 illustrated in FIG. 1 is used. That is, the number of the branch pipes 15b is equal to the number of contact times.

Further, in the surface treatment apparatus 10 illustrated in FIG. 1, the ozone solution 11 is ejected from the fluid ejecting port 15c of the contact member 15 toward the carbon fiber bundle 13 transported inside the ozone solution 11 of the ozone treatment tank 12 so that the moving ozone solution 11 contacts the carbon fiber bundle 13. However, the ejection speed of the ozone solution 11 at this time is desirably from 0.20 m/second to 2.0 m/second, and more desirably from 0.25 m/second to 1.0 m/second. When the ejection speed is 0.20 m/second or more, the ozone solution 11 may easily pass between the single fibers of the carbon fiber bundle 13, and hence the ozone solution 11 may be easily and sufficiently dispersed into the carbon fiber bundle 13. As a result, it is possible to easily obtain the satisfactory adhesiveness between the matrix resin and the carbon fiber subjected to the surface treatment. Meanwhile, when the ejection speed is 2.0 m/second or less, it is possible to suppress the ozone solution 11 from strongly contacting the carbon fiber. Accordingly, the fluffing decreases, and hence degradation in process passability may be suppressed.

The ejection speed of the ozone solution 11 may be controlled by adjusting the pumping pressure of the circulation pump 16 and the like.

Further, the upper-limit value of the distance from the fluid ejecting port 15c of the contact member 15 to the carbon fiber bundle 13 is not particularly limited as long as a distance is ensured in which the ozone solution 11 ejected from the fluid ejecting port 15c reaches the carbon fiber bundle 13 before the ozone solution is dispersed into the ozone solution 11 inside the ozone treatment tank 12 and passes between the single fibers. Meanwhile, the lower-limit value of the distance from the fluid ejecting port 15c to the carbon fiber bundle 13 is not particularly limited as long as a distance is ensured in which the branch pipe 15b does not disturb the transportation of the carbon fiber bundle 13.

Further, the tension of the carbon fiber bundle 13 exerted when the ozone solution 11 contacts the surfaces of the single fibers is desirably from 0.3 kg to 1.8 kg and more desirably from 0.4 kg to 1.5 kg for twelve thousand single fibers. When the tension is 0.3 kg or more, the tension is extremely low, and the fiber bundle is loosened, so that the process passability of the carbon fiber that is continuously manufactured is easily degraded. Meanwhile, when the tension is 1.8 kg or less, the ozone solution may be easily and sufficiently dispersed into the carbon fiber bundle 13. As a result, it is possible to obtain the satisfactory adhesiveness between the matrix resin and the carbon fiber subjected to the surface treatment.

When the surface treatment apparatus 10 illustrated in FIG. 1 is used, the carbon fiber bundle 13 is transported inside the ozone solution 11, and the ozone solution 11 is ejected from the fluid ejecting port 15c toward the carbon fiber bundle 13 during the transportation. At this time, it is not possible to flatly determine the time (holding time) in which the carbon fiber bundle 13 is held inside the ozone solution 11 in that the holding time depends on the ozone concentration, but the holding time is desirably from 0.1 second to 60 seconds when the ozone concentration is within the above-described range. When the holding time is 0.1 second or more, the surface of the carbon fiber may be sufficiently treated. Meanwhile, when the holding time is 60 seconds or less, the productivity may be maintained. From the viewpoint of the surface treatment, the holding time is desirably 1 second or more, more desirably 10 seconds or more, and particularly desirably 30 seconds or more. Meanwhile, the holding time is desirably 50 seconds or less from the viewpoint of productivity.

In the above-described surface treatment method, it is possible to more uniformly treat the surface of the carbon fiber by causing the ozone solution to uniformly contact the surfaces of the single fibers of the carbon fiber bundle having many single fibers. Specifically, it is possible to cause the ozone solution to uniformly contact the surfaces of the single fibers of the carbon fiber bundle of which the number of the single fibers is from 10000 to 60000. When the number of the single fibers is 60000 or less, the ozone solution may easily pass between the single fibers. The lower-limit value of the number of the single fibers of the carbon fiber bundle is desirably 12000 or more, more desirably 18000 or more, and most desirably 25000 or more from the viewpoint of productivity. Further, the upper-limit value of the number of the single fibers of the carbon fiber bundle is desirably 40000 or less and more desirably 30000 or less from the viewpoint of the uniform surface treatment. Furthermore, even when the number of the single fibers is 10000 or less, the ozone solution may uniformly contact the surfaces of the single fibers of the carbon fiber bundle by the above-described surface treatment method. However, when the number of the single fibers is smaller than 10000, a desired carbon fiber may be obtained even in a method (for example, an existing surface treatment method) other than the above-described surface treatment method. The above-described surface treatment method is appropriate for the case where the number of the single fibers is 10000 or more.

The method of setting the number of the single fibers of the carbon fiber bundle within the above-described range is not particularly limited. However, for example, a method of using a precursor fiber having a large tow volume as a starting material and a method of doubling plural precursor fibers having a small tow volume during a carbonizing treatment may be exemplified.

In this way, when the surface of the carbon fiber is treated by using the ozone solution, the oxygen-containing functional group is introduced to the carbon fiber surface as in the case of the surface treatment using the existing electrolytic oxidation treatment.

As a method of checking whether the surface of the carbon fiber is treated, for example, a method of measuring a current value (ipa value) per unit area of the carbon fiber may be exemplified. The ipa value is the index of the surface property of the carbon fiber. Then, the surface area of the carbon fiber increases with an increase in ipa value, and hence the surface treatment may be checked from this measurement. Thus, when the ipa value increases, the adhesiveness with respect to the matrix resin is improved due to the anchor effect in which the contact area between the carbon fiber and the matrix resin increases. The ipa value of the carbon fiber may be obtained according to, for example, the cyclic voltammetry method disclosed in JP 60-246864 A. Furthermore, the cyclic voltammetry method mentioned in the invention is a method of measuring a relation between a current and an electrode potential (voltage) by using the carbon fiber as a working electrode in an analysis device including a potentiostat and a function generator.

Specifically, a solution of which a pH level becomes 3 by 5 mass % of a phosphoric acid aqueous solution and from which dissolved oxygen is removed by jetting nitrogen as bubbles is first prepared. An Ag/AgCl electrode as a reference electrode, a platinum electrode serving as a counter electrode and having a sufficient surface area, and the carbon fiber serving as a working electrode are inserted into the solution so as to measure the current and the electrode potential of the carbon fiber.

A potential-current curve is drawn by an X-Y recorder by setting a potential operation range from −0.2 to 0.8 V and setting a potential operation speed to 2 mV/sec, a current is read out based on the potential of +0.4 V from the Ag/AgCl electrode at the step in which the curve is stabilized by three times or more sweeping operations, and the ipa value is calculated according to the following equation (1). Furthermore, in the equation (1), the "sample length" indicates the length of the carbon fiber used as the working electrode in the length direction, and the "weight basis" indicates the weight per unit length of the carbon fiber used as the working electrode.

$$\text{ipa value}[\mu A/cm^2] = \text{current value}[\mu A]/\text{sample length}[cm] \times \{4\pi \times \text{weight basis}[g/cm] \times \text{number of single fibers/density}[g/cm^3]\}_{1/2} \quad (1)$$

Furthermore, the ozone solution adheres to the surface of the carbon fiber subjected to the surface treatment. The ozone solution adhering to the surface of the carbon fiber may be removed by inserting the carbon fiber into a dryer. In the invention, since the surface of the carbon fiber is treated without using solvent having a high boiling point like the existing electrolytic oxidation treatment, the temperature inside the dryer may be set to a low temperature compared to the case of the electrolytic oxidation treatment. In particular, when water is used as the solvent of the ozone solution, the temperature inside the dryer may be set in accordance with the boiling point of the temperature, and hence the dryer having a comparatively low temperature may be used. Thus, an increase in manufacturing cost may be suppressed.

According to the above-described carbon fiber surface treatment method, since the ozone solution is ejected in a direction intersecting the transportation direction of the carbon fiber bundle transported inside the ozone solution so that the ozone solution passes between the single fibers of the carbon fiber bundle, the ozone solution may be easily dispersed into the carbon fiber bundle. When the ozone solution is dispersed into the carbon fiber bundle, the number of the oxygen-containing functional groups on the carbon fiber surface increases. Accordingly, the carbon fiber that is subjected to the surface treatment by the above-described carbon fiber surface treatment method has excellent adhesiveness with respect to the matrix resin when the carbon fiber is used as a composite material.

Further, since the above-described carbon fiber surface treatment method treats the surface of the carbon fiber without using the electrolytic solution used in the electrolytic oxidation treatment, there is no need to perform a cleaning process after the surface treatment. Further, there is no need to prepare the electrolytic solution that is troublesome compared to the preparation of the ozone solution. Thus, the manufacturing apparatus may be decreased in size or an increase in manufacturing cost may be suppressed by improving the productivity.

Further, since there is no need to provide the cleaning process in the above-described carbon fiber surface treatment method, a cleaning waste liquid generated by the cleaning process does not need to be drained. Further, in a case where the ozone solution used for the surface treatment is drained, the ozone concentration decreases to a harmless level just by leaving the ozone solution in a storage tank for several hours. In a case where the storage tank exists, a simple operation may be performed which absorbs the ozone into active charcoal by an active charcoal treatment on the ozone solution. Thus, since the ozone solution is used for the surface treatment, the environmental burden for the drainage operation may be reduced, and the drainage time is not taken compared to the neutralization treatment. Accordingly, the productivity is improved, and hence an increase in manufacturing cost may be suppressed.

Further, according to the above-described carbon fiber surface treatment method, the surface treatment may be simply performed and the surface treatment may be performed without using an expensive electrode. Thus, since the productivity is improved, it is possible to obtain the same surface treatment effect as that of the case where the surface treatment is performed by a method such as the existing electrolytic oxidation treatment while reducing the manufacturing cost.

Further, according to the above-described carbon fiber surface treatment method, it is possible to easily obtain the carbon fiber of which the ipa value measured by the cyclic voltammetry method is 0.10 $\mu A/cm^2$ or more.

(Other Embodiments)

Furthermore, the carbon fiber surface treatment method is not limited to the above-described method. For example, in the above-described method, the ozone treatment tank 12 is filled with the ozone solution 11 as illustrated in FIG. 1. However, the ozone treatment tank 12 may not be filled with the ozone solution 11 like, for example, the surface treatment apparatus 20 illustrated in FIG. 3. That is, in FIG. 1, the ozone solution 11 is ejected toward the carbon fiber bundle 13 while the carbon fiber bundle 13 is immersed into the ozone solution 11. However, when the ozone solution 11 is ejected toward the carbon fiber bundle 13 so that the ozone solution 11 passes between the single fibers of the carbon fiber bundle 13 and contacts the surfaces of the single fibers, the surface treatment may be performed within a short time by causing the carbon fiber bundle 13 to contact the ozone solution 11 without being immersed into the ozone solution 11 (that is, the surface treatment is performed on the carbon fiber bundle 13 that is transported above the liquid level of the ozone treatment tank 12) as illustrated in FIG. 3.

In the carbon fiber bundle 13 that is not immersed into the ozone solution 11, that is, the carbon fiber bundle 13 that is transported above the liquid level of the ozone treatment tank 12, the moisture content is lower than that of the carbon fiber bundle 13 transported inside the ozone solution 11. Thus, the ozone solution 11 more effectively and uniformly contacts the surfaces of the single fibers until the ozone solution 11 reaches the inside of the carbon fiber bundle 13, and hence the number of the oxygen-containing functional groups on the surfaces of the single fibers easily increases. For this reason, the carbon fiber that is obtained by performing the surface treatment on the carbon fiber bundle 13 transported above the liquid level of the ozone treatment tank 12 may further improve the adhesiveness with respect to the matrix resin when the carbon fiber is used as a composite material.

Figure 3:
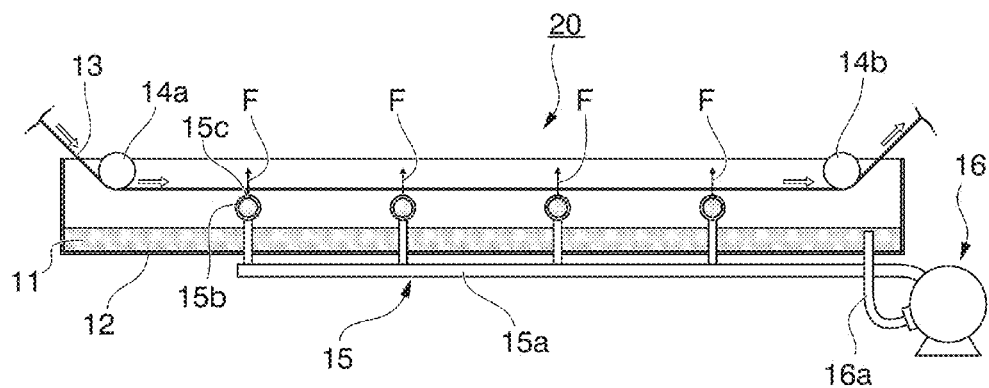
FIG. 3 is a front view schematically illustrating another example of a surface treatment apparatus that is used in a surface treatment for a carbon fiber.

As the method of performing the surface treatment on the carbon fiber bundle 13 that is transported above the liquid level of the ozone treatment tank 12, the method is not limited to the method using the surface treatment apparatus 20 illustrated in FIG. 3. For example, as illustrated in FIGS. 4 to 8, a method may be employed in which the ozone solution 11 passes between the single fibers of the carbon fiber bundle 13 and the ozone solution moving in a direction parallel to the transportation direction of the carbon fiber bundle 13 contacts the carbon fiber. In this way, even when the transportation speed of the carbon fiber bundle 13 is increased, the adhesiveness with respect to the matrix resin is further improved when the carbon fiber subjected to the surface treatment is used as a composite material.

Figure 4:
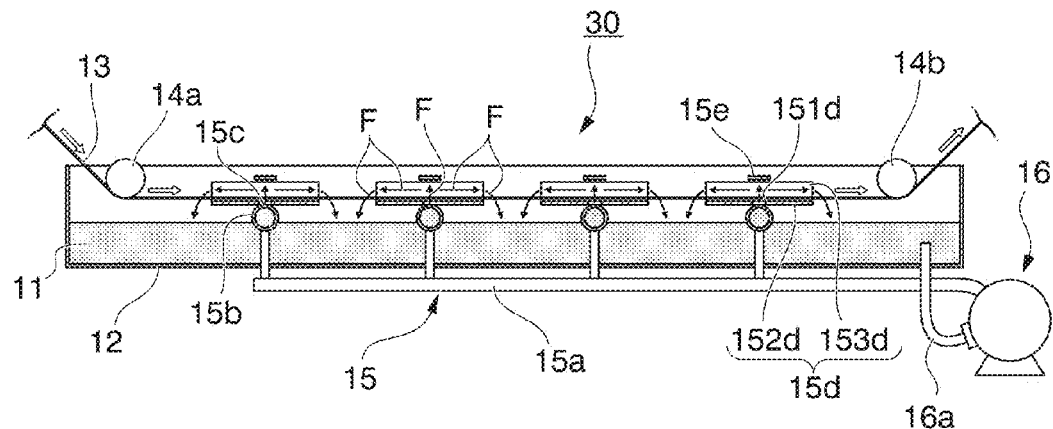
FIG. 4 is a front view schematically illustrating another example of a surface treatment apparatus that is used in a surface treatment for a carbon fiber.
Figure 5:
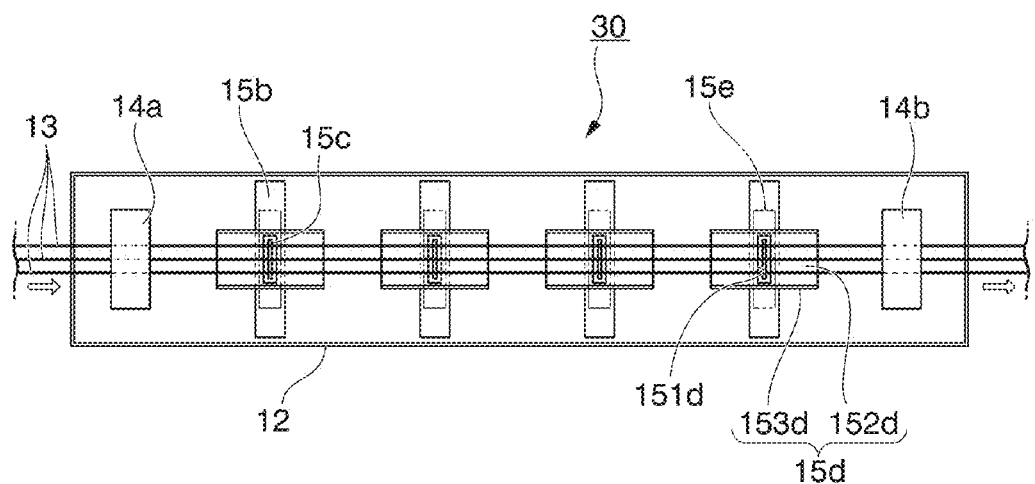
FIG. 5 is a top view illustrating the surface treatment apparatus of FIG. 4.
Figure 6:
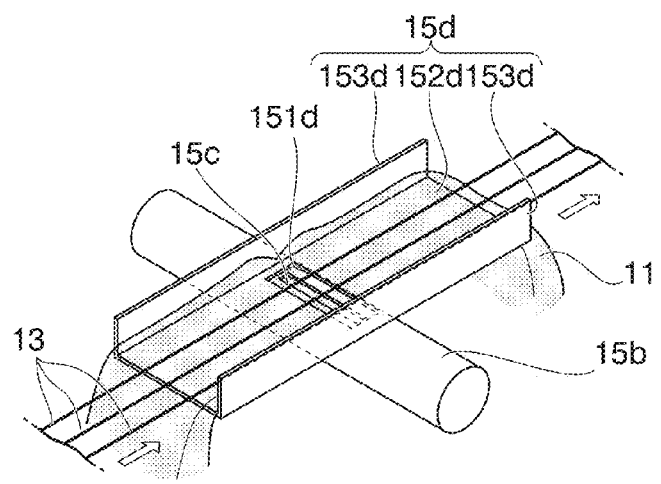
FIG. 6 is a partially perspective view illustrating the surface treatment apparatus of FIG. 4.
Figure 7:
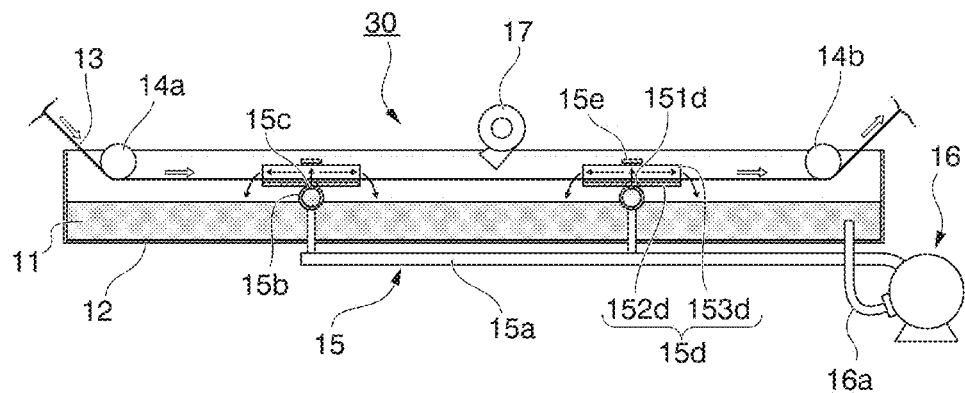
FIG. 7 is a front view schematically illustrating another example of a surface treatment apparatus that is used in a surface treatment for a carbon fiber.
Figure 8:
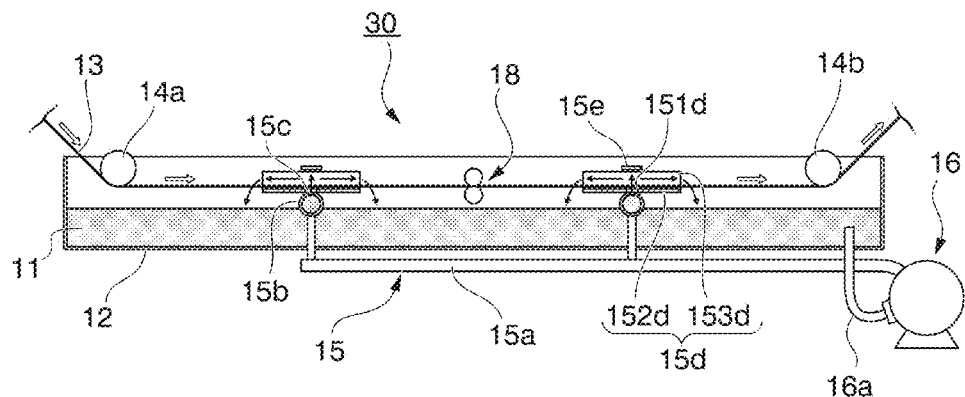
FIG. 8 is a front view schematically illustrating another example of a surface treatment apparatus that is used in a surface treatment for a carbon fiber.

Here, FIGS. 4, 7, and 8 are front views schematically illustrating another example of the surface treatment apparatus that treats the surface of the carbon fiber, where FIG. 5 is a top view illustrating the surface treatment apparatus of FIG. 4, and FIG. 6 is a partially perspective view illustrating the surface treatment apparatus of FIG. 4.

Furthermore, in FIG. 5, the ozone solution 11, the pipe 15a, the circulation pump 16, and the suction pipe 16a will be omitted. Further, in FIG. 6, the ozone treatment tank 12, the first free roll 14a, the second free roll 14b, the pipe 15a, the collision plate 15e, the circulation pump 16, and the suction pipe 16a will be omitted.

A surface treatment apparatus 30 illustrated in FIGS. 4 to 8 further includes a rectifying plate 15d that is installed above the liquid level of the ozone treatment tank 12 and the upper portion of the fluid ejecting port 15c of the branch pipe 15b and a collision plate 15e that is installed at the upper portion of the rectifying plate 15d so as to be located at a position facing the fluid ejecting port 15c with the carbon fiber bundle 13 interposed therebetween.

The number of times (the number of contact times) of ejecting the ozone solution 11 from the fluid ejecting port 15c toward the carbon fiber bundle 13 so that the ozone solution contacts the surfaces of the single fibers is four times in FIG. 4 and two times in FIGS. 7 and 8.

The rectifying plate 15d is used to move the ozone solution 11 passing between the single fibers of the carbon fiber bundle 13 in a direction parallel to the transportation direction of the carbon fiber bundle 13. As illustrated in FIG. 6, the rectifying plate 15d of this example includes a bottom plate 152d that has a rectangular hole 151d formed at a position directly above the fluid ejecting port 15c and two side plates 153d that are perpendicularly attached to the bottom plate 152d so as to face each other, and the bottom plate 152d and the side plate 153d form a gutter-shaped channel through which the ozone solution 11 flows.

Furthermore, in the invention, the rectifying plate 15d that forms the channel by the bottom plate 152d and the side plate 153d is referred to as a "rectifying plate with a channel".

It is desirable that the length of the channel of the rectifying plate 15d be 150 mm or more. When the length of the channel is 150 mm or more, the adhesiveness with respect to the matrix resin is further improved when the carbon fiber is used as a composite material subjected to the surface treatment. The upper limit of the length of the channel is not particularly limited. However, when the length is too long, the facility increases in size and occupies a space, and hence 500 mm or less is desirable. It is more desirable that the length of the channel be from 200 mm to 400 mm.

Further, the length of the channel is appropriately set in response to the transportation speed of the carbon fiber bundle 13. Specifically, it is desirable to adjust the length of the channel so that the time (the staying time) in which the ozone solution 11 stays inside the channel is 1 second or more. When the staying time is 1 second or more, the holding time for the carbon fiber bundle 13 may be sufficiently ensured. Accordingly, the adhesiveness with respect to the matrix resin is further improved when the carbon fiber is used as a composite material subjected to the surface treatment. The upper limit of the staying time is not particularly limited, but since an increase in staying time leads to an increase in size, 10 seconds or less are desirable. The staying time of 3 seconds to 8 seconds is more desirable.

Furthermore, the length of the channel is equal to the length of the side between the bottom plate 152d and the side plate 153d.

The collision plate 15e is used to change the movement direction of the ozone solution 11 passing between the single fibers of the carbon fiber bundle 13 to a direction parallel to the transportation direction of the carbon fiber bundle 13. Since the ozone solution 11 passing between the single fibers of the carbon fiber bundle 13 collides with the collision plate 15e, the ozone solution 11 that moves in a direction (a perpendicular direction of FIGS. 4 to 8) intersecting the transportation direction of the carbon fiber bundle 13 may be easily moved in a direction parallel to the transportation direction of the carbon fiber bundle 13.

The shape or the size of the collision plate 15e is not particularly limited as long as the surface of the collision plate 15e colliding with the ozone solution 11 is larger than the cross-sectional area of the fluid ejecting port 15c.

In a case where the surface treatment apparatus 30 illustrated in FIGS. 4 to 8 is used, the carbon fiber bundle 13 is transported above the liquid level of the ozone treatment tank 12 while passing through the channel of the rectifying plate 15d. Then, the ozone solution 11 that is ejected from the fluid ejecting port 15c toward the carbon fiber bundle 13 reaches the carbon fiber bundle 13 while passing through the hole 151d of the bottom plate 152d of the rectifying plate 15d, and passes between the single fibers. The ozone solution 11 that passes between the single fibers is naturally dropped, flows through the channel of the rectifying plate 15d, and is discharged from both ends of the rectifying plate 15d to the ozone treatment tank 12. When the ozone solution 11 flows through the channel of the rectifying plate 15d, the ozone solution contacts the carbon fiber bundle 13 passing through the channel. The movement direction of the ozone solution 11 that flows through the channel of the rectifying plate 15d is parallel to the transportation direction of the carbon fiber bundle 13.

Further, since the collision plate 15e is installed at a position facing the fluid ejecting port 15c with the carbon fiber bundle 13 interposed therebetween, the ozone solution 11 passing between the single fibers of the carbon fiber bundle 13 may collide with the collision plate 15e so that the movement direction of the ozone solution 11 changes to a direction parallel to the transportation direction of the carbon fiber bundle 13.

Since the ozone solution 11 that moves in a direction parallel to the transportation direction of the carbon fiber bundle 13 sufficiently contacts the carbon fiber after the ozone solution 11 passes between the single fibers of the carbon fiber bundle 13, it is desirable that the ejection amount (hereinafter, simply referred to as the "ejection amount of the ozone solution") of the ozone solution 11 that is ejected from the fluid ejecting port 15*c* per unit time be forty times or more with respect to the mass of the carbon fiber bundle that passes above the fluid ejecting port 15*c* per unit time.

For example, the general density of the carbon fiber is from 1.7 g/cm$^3$ to 1.9 g/cm$^3$. Then, when the ozone solution having a specific weight of 1.0 g/cm$^3$ is supplied to the carbon fiber by the amount of forty times, the ozone solution having a volume of about one hundred times the carbon fiber bundle passing above the fluid ejecting port is supplied to the carbon fiber bundle. Thus, it is considered that the ozone solution 11 may sufficiently contact the carbon fiber bundle when the ejection amount of the ozone solution 11 is forty times or more the mass of the carbon fiber bundle 13. The upper limit of the ejection amount of the ozone solution 11 is not particularly limited. However, when the amount of the ozone solution 11 ejected from the fluid ejecting port 15*c* increases too much, the ejection speed becomes faster so that the ozone solution 11 strongly contacts the carbon fiber. Accordingly, the fluffing easily occurs, and hence the process passability tends to be degraded. When the shape of the fluid ejecting port 15*c* is changed, the ejection speed may be suppressed even when the ejection amount of the ozone solution 11 is increased, but an increase in the ejection amount of the ozone solution 11 leads to an increase in manufacturing cost. Thus, it is desirable that the upper-limit value of the ejection amount of the ozone solution 11 be three hundred times or less with respect to the mass of the carbon fiber bundle passing above the fluid ejecting port 15*c* per unit time. In particular, when the ejection speed of the ozone solution 11 is from 0.20 m/second to 2.0 m/second, it is desirable to set the ejection amount of the ozone solution 11 within the above-described range.

As illustrated in FIGS. 3 to 8, when the surface treatment is performed on the carbon fiber bundle 13 that is transported above the liquid level of the ozone treatment tank 12, it is desirable that the permeation resistance of the carbon fiber bundle 13 to be subjected to the surface treatment be from 100 seconds to 700 seconds. When the permeation resistance is 100 seconds or more, a toe crack hardly occurs, and the sufficient convergence may be easily held. Meanwhile, when the permeation resistance is 700 seconds or less, the convergence is not too strong, and the ozone solution may easily contact the inside of the carbon fiber bundle. It is desirable that the permeation resistance be from 100 seconds to 300 seconds.

As for the permeation resistance of the carbon fiber bundle 13, it is desirable that the permeation resistance of the carbon fiber bundle 13 immediately before the contact of the ozone solution 11 with respect to the carbon fiber bundle by at least the first ejection be within the above-described range, and it is more desirable that each permeation resistance of the carbon fiber bundle 13 immediately before the contact of the ozone solution 11 with respect to the carbon fiber bundle by each ejection be within the above-described range when the number of contact times is two or more.

Furthermore, in the invention, the permeation resistance is obtained by referring to the permeability test method for paper and cardboard measured based on JIS P 8117:2009 (ISO 5636-5: 2003). According to JIS P 8117: 2009, the permeation resistance (air resistance) is defined as the "the time in which 100 mL of air passes through paper or cardboard having an area of 642 mm$^2$" when a fixed plate having a circular hole with a diameter of 28.6±0.1 mm is used. In the invention, the permeation resistance is obtained by the measurement based on JIS P 8117:2009 using the carbon fiber bundle instead of the paper.

Further, when the surface treatment is performed on the carbon fiber bundle 13 transported above the liquid level of the ozone treatment tank 12, it is desirable that the moisture content of the carbon fiber bundle 13 subjected to the surface treatment be 40% or less. When the moisture content is 40% or less, the ozone solution 11 more effectively and uniformly contacts the surfaces of the single fibers until the ozone solution 11 reaches the inside of the carbon fiber bundle 13, so that the number of the oxygen-containing functional groups on the surfaces increase. For this reason, it is possible to further improve the adhesiveness with respect to the matrix resin when the obtained carbon fiber is used as a composite material.

As for the moisture content of the carbon fiber bundle 13, it is desirable that the moisture content of the carbon fiber bundle 13 immediately before the contact of the ozone solution 11 with respect to the carbon fiber bundle by at least the first ejection be within the above-described range, and it is more desirable that each moisture content of the carbon fiber bundle 13 immediately before the contact of the ozone solution 11 with respect to the carbon fiber bundle by each ejection be within the above-described range when the number of contact times is two or more.

Furthermore, when the number of contact times is one, the moisture content of the carbon fiber bundle 1 immediately before the contact of the ozone solution 11 with respect to the carbon fiber bundle by the ejection is 0% since the carbon fiber bundle 13 is transported above the liquid level of the ozone treatment tank 12.

Further, since the moisture content of the carbon fiber bundle 13 immediately after the contact of the ozone solution 11 with respect to the carbon fiber bundle is 100%, it is desirable to decrease the moisture content of the carbon fiber bundle 13, for example, as below when the number of contact times is two or more.

As illustrated in FIG. 7, an air blower 17 is installed between two rectifying plates 15*d*, air blows from the air blower 17 toward the carbon fiber bundle 13 passing through the channel of the downstream rectifying plate 15*d*, and the ozone solution 11 is removed from the carbon fiber bundle 13 until a desired moisture content is obtained.

Further, as illustrated in FIG. 8, nip rolls 18 are installed between two rectifying plates 15*d*, the carbon fiber bundle 13 passing through the channel of the downstream rectifying plate 15*d* is nipped between the nip rolls 18, and the ozone solution 11 is removed from the carbon fiber bundle 13 until a desired moisture content is obtained. A flat roll may be used instead of the nip rolls 18.

The moisture content of the carbon fiber bundle may be obtained as below.

First, the carbon fiber bundle immediately before the contact of the ozone solution with respect to the carbon fiber bundle by the ejection from the fluid ejecting port is sampled, and is dried by a steam dryer at 105° C. for one hour so as to evaporate the moisture from the carbon fiber bundle. The moisture content is obtained based on the following equation (2) by the measurement of the mass ($W_1$) of the non-dried carbon fiber bundle and the mass ($W_2$) of the dried carbon fiber bundle.

$$\text{moisture content[mass \%]} = \{(W_1 - W_2)/W_2\} \times 100 \quad (2)$$

The carbon fiber surface treatment method is not limited to the method that uses the surface treatment apparatuses 10, 20, and 30 illustrated in FIGS. 1 to 8.

In FIGS. 1 to 8, the ejection direction F of the ozone solution 11 is set to a direction perpendicular to the transportation direction of the carbon fiber bundle 13, but the ejection direction F is not limited to the perpendicular direction as long as the direction intersects the transportation direction of the carbon fiber bundle 13, that is, the direction is not the parallel direction. Here, the perpendicular direction is particularly desirable in that the ozone solution easily passes between the single fibers of the carbon fiber bundle.

Further, in FIGS. 1 to 8, the ejection direction of the ozone solution 11 is set to the upward direction (that is, the direction from the downside of the horizontal carbon fiber bundle 13 toward the upside thereof), but may be the downward direction (that is, the direction from the upside of the carbon fiber bundle 13 toward the downside thereof). Here, as illustrated in FIGS. 1 to 8, it is desirable that the ejection direction F of the ozone solution 11 be set to the upward direction in that the ejection speed becomes faster compared to the downward direction since the ozone solution moves in the atmosphere.

Further, in FIGS. 1 to 8, the ozone solution 11 is ejected from the fluid ejecting port 15*c* of the contact member 15. However, for example, the ozone solution may be naturally dropped from the upside of the carbon fiber bundle toward the downside thereof so as to contact the carbon fiber.

Further, the fluid ejecting port 15*c* of the contact member 15 illustrated in FIGS. 1 to 8 is formed in a rectangular shape, but the shape of the fluid ejecting port 15*c* is not particularly limited. Further, the branch pipe 15*b* of the contact member 15 may not be long. Further, the number of the carbon fiber bundles 13 may be one or two, and may be three or four or more as illustrated in FIGS. 2, 5, and 6. However, when plural carbon fiber bundles 13 are transported in parallel so that the surface treatment is performed thereon at one time, it is desirable to eject the ozone solution 11 from the long branch pipe 15*b* provided with the rectangular fluid ejecting port 15*c* as illustrated in FIGS. 1 to 8. In this case, since the arrangement direction of the plural carbon fiber bundles 13 is parallel to the length direction of the branch pipe 15*b*, all carbon fiber bundles may uniformly contact the moving ozone solution.

<Carbon Fiber Manufacturing Method>

The carbon fiber manufacturing method of the invention includes a surface treatment step of treating the surface of the carbon fiber.

As the method of treating the surface of the carbon fiber, the above-described carbon fiber surface treatment method may be exemplified.

The carbon fiber subjected to the surface treatment may be obtained by carbonizing the precursor fiber of the carbon fiber at a high temperature. As the carbonizing method, for example, a method may be exemplified in which the carbon fiber precursor fiber bundle obtained by binding the precursor fiber of the carbon fiber is subjected to the flame-resistant treatment at the flame-resistant furnace and is subjected to the pre-carbonizing treatment and the carbonizing treatment in the carbonizing furnace.

As the precursor fiber, for example, a polyacrylonitrile fiber, a pitch fiber, and a rayon fiber may be exemplified, but a polyacrylonitrile fiber is desirably used from the balance of the cost and the performance.

In the flame-resistant treatment, the carbon fiber precursor fiber bundle is input to the flame-resistant furnace so as to perform the flame-resistant treatment thereon. An oxidization atmosphere of 200 to 300° C. is circulated inside the flame-resistant furnace, and the carbon fiber precursor fiber bundle is subjected to the flame-resistant treatment while being transported inside the oxidization atmosphere. Furthermore, the direction of the stream of the oxidization atmosphere circulating inside the flame-resistant furnace is not particularly limited, and may be parallel to or perpendicular to the transported fiber to be treated.

As the oxidization atmosphere, an existing oxidization atmosphere such as air, oxygen, and nitrogen dioxide may be employed, but air is desirable from the viewpoint of economy.

The time necessary for the flame-resistant treatment of the carbon fiber precursor fiber bundle is desirably 30 to 100 minutes and more desirably 45 to 80 minutes from the viewpoint of improving the productivity and the performance of the carbon fiber. When the time necessary for the flame-resistant treatment is shorter than 30 minutes, the flame-resistant reaction insufficiently or non-uniformly occurs. Accordingly, the fluffing and the bundle breakage occur in the later carbonizing process, and hence the productivity is degraded. Meanwhile, when the time necessary for the flame-resistant treatment exceeds 100 minutes, the flame-resistant device increases in size or the productivity is degraded due to the high flame-resistant treatment speed.

In the pre-carbonizing treatment, the carbon fiber subjected to the flame-resistant treatment is input to a first carbonizing furnace so as to perform a pre-carbonizing treatment thereon. An inert atmosphere having a temperature of 300 to 800° C. circulates inside the first carbonizing furnace, and the carbon fiber subjected to the flame-resistant treatment is subjected to the pre-carbonizing treatment while being transported inside the inert atmosphere. Furthermore, the direction of the stream of the inert atmosphere circulating inside the first carbonizing furnace is not particularly limited, and may be parallel to or perpendicular to the transported fiber to be treated.

As the inert atmosphere, an existing inert atmosphere such as nitrogen, argon, and helium may be employed, but nitrogen is desirable from the viewpoint of economy.

In the carbonizing treatment, the carbon fiber subjected to the pre-carbonizing treatment is input to a second carbonizing furnace so as to perform a carbonizing treatment thereon. An inert atmosphere having a maximum temperature of 1000 to 2500° C. circulates inside the second carbonizing furnace, and the carbon fiber subjected to the pre-carbonizing treatment is subjected to a carbonizing treatment while being transported inside the inert atmosphere. Furthermore, the direction of the stream of the inert atmosphere circulating inside the second carbonizing furnace is not particularly limited, and may be parallel to or perpendicular to the transported fiber to be treated.

As the inert atmosphere, an inert atmosphere selected from the exemplified existing inert atmospheres may be used, and nitrogen is desirable from the viewpoint of economy.

The carbon fiber that is obtained in this way is subjected to the surface treatment by the above-described carbon fiber surface treatment method.

Further, in the invention, a sizing treatment may be performed on the carbon fiber subjected to the surface treatment by a sizing agent if necessary. When the sizing treatment is performed, the convergence of the fiber is improved. Accordingly, the fiber may be easily handled and the adhesiveness with respect to the matrix resin thereof is also improved. The type of the sizing agent is not particularly limited as long as a desired characteristic may be obtained. For example, a sizing agent mainly including an epoxy resin, a polyether resin, an epoxy-modified polyurethane resin, and a polyester resin may be exemplified.

As the method of the sizing treatment, an existing method may be used.

As described above, the carbon fiber manufacturing method of the invention includes the surface treatment step of performing the surface treatment on the carbon fiber using the ozone solution by causing the ozone solution to be ejected from the fluid ejecting port toward the carbon fiber bundle so that the ozone solution passes between the single fibers of the carbon fiber bundle so as to contact the surfaces of the single fibers. Thus, the ozone solution may be easily dispersed into the carbon fiber bundle. When the ozone solution is dispersed into the carbon fiber bundle, the number of the oxygen-containing functional groups on the surfaces of the carbon fibers increases, and hence a carbon fiber having excellent adhesiveness with respect to a matrix resin may be obtained.

<Carbon Fiber>

In the carbon fiber subjected to the surface treatment obtained by the carbon fiber manufacturing method of the invention, the ipa value measured by the cyclic voltammetry method is desirably 0.10 $\mu A/cm^2$ or more and 0.12 $\mu A/cm^2$ or more. As described above, the ipa value is the index of the surface property of the carbon fiber bundle, and means that the surface treatment is performed as the ipa value increases. When the ipa value is 0.10 $\mu A/cm^2$ or more, it means that the surface treatment (oxidization) is sufficiently performed. Accordingly, the adhesiveness with respect to the matrix resin becomes satisfactory when the carbon fiber is used as a composite material, and hence a composite material having a sufficient bending strength may be obtained.

The upper-limit value of the ipa value is not particularly limited.

The carbon fiber of the invention is combined with a matrix resin so as to be formed as a composite material, and is used for various purposes. The matrix resin is not particularly limited. For example, an epoxy resin, a polyimide resin, a polycarbonate resin, an acrylic resin as a radical polymerization-based resin, a vinylester resin, an unsaturated polyester resin, a thermoplastic acrylic resin, a phenol resin, or the like may be exemplified. Further, a commercial product may be used. Since the carbon fiber of the invention is subjected to the surface treatment by the above-described surface treatment method of the invention, the adhesiveness with respect to the matrix resin is excellent.

The application purpose of the composite material that uses the carbon fiber of the invention is not particularly limited. For example, the composite material may be used for various application purposes such as an aerospace material, a sports material, a leisure material, and an industrial material for a pressure container or the like.

EXAMPLES

Hereinafter, the invention will be described in detail by Examples, but the invention is not limited thereto.

The measurement and evaluation methods in the respective examples were performed by the following methods.

<Measurement and Evaluation Methods>

(Measurement of Ejection Speed)

The ejection speed of the ozone solution was obtained in a manner such that the amount of water ejected from the fluid ejecting port for 1 minute was sampled, the mass thereof was obtained, and the mass was divided by the cross-sectional area of the fluid ejecting port.

(Measurement of Moisture Content)

The moisture content of the carbon fiber bundle was measured as below.

First, the carbon fiber bundle immediately before the contact of the ozone solution with respect to the carbon fiber bundle by the ejection from the fluid ejecting port located at the most downstream side was sampled, and was dried by the steam dryer at 105° C. for one hour so as to evaporate the moisture from the carbon fiber bundle. The moisture content was obtained based on the following equation (2) by the measurement of the mass ($W_1$) of the non-dried carbon fiber bundle and the mass ($W_2$) of the dried carbon fiber bundle.

moisture content[mass %]=$\{(W_1-W_2)/W_2\} \times 100$    (2)

(Measurement of Permeation Resistance)

The permeation resistance of the carbon fiber bundle was measured as below.

First, the carbon fiber bundle immediately before the contact of the ozone solution with respect to the carbon fiber bundle by the ejection from the fluid ejecting port located at the most downstream side was sampled, and the permeation resistance was obtained by using the carbon fiber bundle instead of fiber with reference to the permeability test method for paper and cardboard measured based on JIS P 8117:2009 (ISO 5636-5: 2003).

(Measurement of Strand Strength and Strand Modulus)

The strand strength and the strand modulus of the carbon fiber subjected to the surface treatment were obtained by measuring the tensile property of the epoxy resin impregnated strand based on ASTM D4018.

(Measurement of ipa Value)

The ipa value of the carbon fiber subjected to the surface treatment was obtained as below by the cyclic voltammetry method. Furthermore, as the measurement device, an analysis device ("HZ-3000 AUTOMATIC POLARIZATION SYSTEM" manufactured by HOKUTO DENKO CORP.) including a potentiostat and a function generator was used.

First, a solution of which a pH level became 3 by 5 mass % of a phosphoric acid aqueous solution and from which dissolved oxygen was removed by jetting nitrogen as bubbles was prepared. An Ag/AgCl electrode as a reference electrode, a platinum electrode serving as a counter electrode and having a sufficient surface area, and the carbon fiber serving as a working electrode were inserted into the solution so as to measure the current and the electrode potential of the carbon fiber.

A potential-current curve was drawn by an X-Y recorder by setting a potential operation range from −0.2 to 0.8 V and setting a potential operation speed to 2 mV/sec, a current was read out based on the potential of +0.4 V from the Ag/AgCl electrode at the step in which the curve was stabilized by three times or more sweeping operations, and the ipa value was calculated according to the following equation (1). Furthermore, in the equation (1), the "sample length" indicates the length of the carbon fiber used as the working electrode in the length direction, and the "weight basis" indicates the weight per unit length of the carbon fiber used as the working electrode.

ipa value[$\mu A/cm^2$]=current value[$\mu A$]/sample length [cm]×$\{4\pi \times$weight basis[g/cm]×number of single fibers/density[$g/cm^3$]$\}^{1/2}$    (1)

(Evaluation of Adhesiveness)

A fiber-reinforced plastic plate (having a plate thickness of 2 mm) of which the content of the carbon fiber was 60% in volume content was manufactured by using the carbon fiber subjected to the surface treatment and the epoxy resin ("#1350" manufactured by Mitsubishi Rayon Co., Ltd.) as the matrix resin.

The bending strength (FS90°) in a direction perpendicular to the fiber direction was measured by a short beam method of three point bending based on ASTM D790 with respect to the obtained fiber-reinforced plastic plate. Furthermore, it means that the adhesiveness between the carbon fiber and the matrix resin becomes excellent as the bending strength becomes higher.

Example 1

A flame-resistant fiber bundle was obtained by performing a heating treatment (a flame-resistant treatment) on an acrylic fiber of which the single fiber fineness was 1.2 dtex and the number of single fibers was 12000 at the stretching rate of −6.0% and the temperature of 220° C. to 260° C. until the flame-resistant treatment ended.

Then, an untreated carbon fiber was obtained by performing a precarbonizing treatment on the flame-resistant fiber bundle in a nitrogen atmosphere of 700° C. at the stretching rate of +3% and performing a carbonizing treatment thereon in a nitrogen atmosphere of 1250° C. at the stretching rate of −4.2%.

The obtained untreated carbon fiber was subjected to the surface treatment as below by using the surface treatment apparatus 10 illustrated in FIG. 1.

Furthermore, the ozone solution 11 was prepared by aerating an ozone gas generated from an ozone generator (manufactured by SUMITOMO PRECISION PRODUCTS Co., Ltd.) in pure water and dissolving the ozone gas in pure water while adjusting the ozone concentration in the pure water to 30 mg/L. The ozone concentration was measured by an ozone concentration sensor (of a dissolved ozone measurement type).

The carbon fiber bundle 13 was immersed into the ozone treatment tank 12 filled with the ozone solution 11 having an ozone concentration of 30 mg/L through the first free roll 14a, the ozone solution 11 was ejected from the fluid ejecting port 15c of the contact member 15 toward the carbon fiber bundle 13 transported inside the ozone treatment tank 12 at the transportation speed of 3 m/minute, and the ozone solution 11 was caused to pass between the single fibers of the carbon fiber bundle 13 so as to contact the surfaces of the single fibers.

Furthermore, the movement direction F of the ozone solution 11 was set to the upward perpendicular direction with respect to the transportation direction of the carbon fiber bundle 13.

Further, the times (the number of contact times) of ejecting the ozone solution 11 from the fluid ejecting port 15c toward the carbon fiber bundle 13 so as to contact the surfaces of the single fibers was set to four times, the ejection speed of the ozone solution 11 was set to 0.42 m/second, the tensile strength for twelve thousand single fibers of the carbon fiber bundle 13 when the ozone solution 11 contacted the surfaces of the single fibers was set to 0.4 kg, the ejection amount of the ozone solution 11 per unit time with respect to the mass of the carbon fiber bundle 13 passing above the fluid ejecting port 15c per unit time was set to two hundred eight times, and the time (holding time) of holding the carbon fiber bundle 13 inside the ozone solution 11 was set to 45 seconds. Further, the distance from the fluid ejecting port 15c to the carbon fiber bundle 13 was set to 5 cm.

Furthermore, the holding time in a case where the surface treatment is performed on the carbon fiber bundle 13 by using the surface treatment apparatus 10 illustrated in FIG. 1 indicates the time in which the carbon fiber bundle 13 is transported inside the ozone solution 11 of the ozone treatment tank 12.

Next, the carbon fiber subjected to the surface treatment was obtained by leading the carbon fiber bundle 13 to the outside of the ozone treatment tank 12 by the second free roll 14b, drying the carbon fiber bundle at 150° C. for 0.5 minutes, removing the ozone solution adhering to the surface of the carbon fiber, and performing the sizing treatment thereon.

The moisture content and the permeation resistance of the carbon fiber bundle immediately before the contact of the ozone solution with respect to the carbon fiber bundle by the first ejection were measured. Further, the adhesiveness was evaluated by measuring the strand strength, the strand modulus, and the ipa value of the carbon fiber subjected to the surface treatment. The results are illustrated in Table 1.

Examples 2 and 3

Various measurements and evaluations were performed by performing the carbon fiber surface treatment as in Example 1 except that the tension for twelve thousand single fibers was changed as illustrated in Table 1. The result is illustrated in Table 1.

Example 4

A flame-resistant fiber bundle was obtained by performing a heating treatment (a flame-resistant treatment) on an acrylic fiber of which the single fiber fineness was 1.0 dtex and the number of single fibers was 60000 at the stretching rate of −6.0% and the temperature of 220° C. to 260° C. until the flame-resistant treatment ended. Then, an untreated carbon fiber was obtained by performing a precarbonizing treatment on the flame-resistant fiber bundle in a nitrogen atmosphere of 700° C. at the stretching rate of +3% and performing a carbonizing treatment thereon in a nitrogen atmosphere of 1350° C. at the stretching rate of −4.2%.

Various measurements and evaluations were performed by performing the carbon fiber surface treatment as in Example 1 except that the ejection amount of the ozone solution 11 per unit time with respect to the mass of the carbon fiber bundle 13 passing above the fluid ejecting port 15c per unit time by using the obtained untreated carbon fiber was set to fifty two times. The result is illustrated in Table 1.

Example 5

Various measurements and evaluations were performed as in Example 1 except that the surface treatment was performed as below by using the surface treatment apparatus 30 illustrated in FIG. 4 instead of the surface treatment apparatus 10 illustrated in FIG. 1. The result is illustrated in Table 1.

The carbon fiber bundle 13 was caused to pass through the channel of the rectifying plate 15d by using the first free roll 14a and the second free roll 14b so that the carbon fiber bundle 13 is transported above the liquid level of the ozone treatment tank 12 filled with the ozone solution 11 having an ozone concentration of 30 mg/L. The ozone solution 11 was ejected from the fluid ejecting port 15c of the contact member 15 toward the carbon fiber bundle 13 transported (passing) through the channel of the rectifying plate 15d at the transportation speed of 8 m/minute. The ejected ozone solution 11 reached the carbon fiber bundle 13 through the hole 151d of the bottom plate 152d of the rectifying plate 15d, and passed between the single fibers so as to contact the surfaces of the single fibers. Further, the ozone solution 11 passing between the single fibers collided with the collision plate 15e, flowed through the channel of the rectifying plate 15d while contacting the carbon fiber bundle 13 so as to change the movement direction of the ozone solution 11 to a direction parallel to the transportation direction of the carbon fiber bundle 13, and was discharged from both ends of the rectifying plate 15d to the ozone treatment tank 12.

Furthermore, the movement direction F of the ozone solution 11 was set to the upward perpendicular direction with respect to the transportation direction of the carbon fiber bundle 13, and the movement direction F of the ozone solution 11 flowing through the channel of the rectifying plate 15d was set to the parallel direction with respect to the transportation direction of the carbon fiber bundle 13. Here, the movement direction F of the ozone solution 11 flowing through the channel from the downstream end of the rectifying plate 15d to the hole 151d is opposite to the transportation direction of the carbon fiber bundle 13, and the movement direction F of the ozone solution 11 flowing through the channel from the hole 151d to the upstream end of the rectifying plate 15d is the same as the transportation direction of the carbon fiber bundle 13.

Further, the times (the number of contact times) of ejecting the ozone solution 11 from the fluid ejecting port 15c toward the carbon fiber bundle 13 so as to contact the surfaces of the single fibers was set to four times, the ejection speed of the ozone solution 11 was set to 0.42 m/second, the tension for twelve thousand single fibers of the carbon fiber bundle 13 when the ozone solution 11 contacted the surfaces of the single fibers was set to 0.4 kg, the ejection amount of the ozone solution 11 per unit time with respect to the mass of the carbon fiber bundle 13 passing above the fluid ejecting port 15c per unit time was set to seventy eight times, and the time (holding time) of holding the carbon fiber bundle 13 inside the ozone solution 11 was set to 2.3 seconds. Further, the distance from the fluid ejecting port 15c to the carbon fiber bundle 13 was set to 5 cm, and the channel of the rectifying plate 15d was set to 300 mm.

Furthermore, the holding time in a case where the surface treatment is performed on the carbon fiber bundle 13 by using the surface treatment apparatus 30 illustrated in FIG. 4 is the sum of the time in which the carbon fiber bundle 13 passes through four channels of the rectifying plate 15d.

Example 6

The carbon fiber surface treatment was performed as in Example 5 except that the times (the number of contact times) of ejecting the ozone solution 11 from the fluid ejecting port 15c toward the carbon fiber bundle 13 so as to contact the surfaces of the single fibers by using the surface treatment apparatus 30 illustrated in FIG. 7 instead of the surface treatment apparatus 30 illustrated in FIG. 4 was two times, the ejection amount of the ozone solution 11 per unit time with respect to the mass of the carbon fiber bundle 13 passing above the fluid ejecting port 15c per unit time was forty times, the time (holding time) for holding the carbon fiber bundle 13 inside the ozone solution 11 was 1.2 seconds, and air blown from the air blower 17 installed between two rectifying plates 15d at the flow rate of 150 L/minute so as to remove the ozone solution 11 from the carbon fiber bundle 13 until the carbon fiber bundle 13 passing through the downstream channel of the rectifying plate 15d moved to the upstream channel of the rectifying plate 15d. Various measurements and evaluations were performed on the obtained carbon fiber as in Example 1. The result is illustrated in Table 1.

Furthermore, the holding time in a case where the surface treatment is performed on the carbon fiber bundle 13 by using the surface treatment apparatus 30 illustrated in FIG. 7 indicates the sum of the time in which the carbon fiber bundle 13 passes through two channels of the rectifying plate 15d.

Example 7

The carbon fiber surface treatment was performed as in Example 6 except that the times (the number of contact times) of ejecting the ozone solution 11 from the fluid ejecting port 15c toward the carbon fiber bundle 13 so as to contact the surfaces of the single fibers by using the surface treatment apparatus 30 illustrated in FIG. 7 instead of the surface treatment apparatus 30 illustrated in FIG. 4 was two times, the ejection amount of the ozone solution 11 per unit time with respect to the mass of the carbon fiber bundle 13 passing above the fluid ejecting port 15c per unit time was forty times, the time (holding time) for holding the carbon fiber bundle 13 inside the ozone solution 11 was 1.2 seconds, and the carbon fiber bundle 13 was nipped by the nip roll 18 having a diameter of 100 mm and installed between two rectifying plates 15d at the pressure of 0.2 MPa so as to remove the ozone solution 11 from the carbon fiber bundle 13 until the carbon fiber bundle 13 passing through the downstream channel of the rectifying plate 15d moved to the upstream channel of the rectifying plate 15d. Various measurements and evaluations were performed on the obtained carbon fiber as in Example 1. The result is illustrated in Table 1.

Furthermore, the holding time in a case where the surface treatment is performed on the carbon fiber bundle 13 by using the surface treatment apparatus 30 illustrated in FIG. 8 indicates the sum of the time in which the carbon fiber bundle 13 passes through two channels of the rectifying plate 15d.

Comparative Examples 1 and 2

Figure 9:
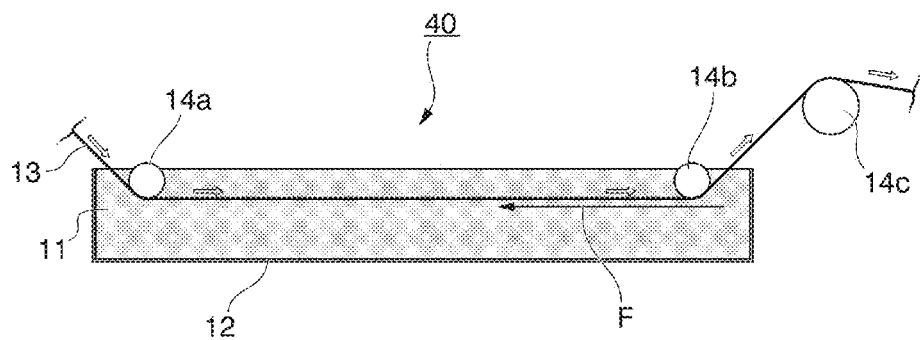
FIG. 9 is a front view schematically illustrating a surface treatment apparatus that is used in Comparative Example.

Various measurements and evaluations were performed by performing the carbon fiber surface treatment as in Example 1 except that the ozone solution 11 moving in a direction parallel to or opposite to the transportation direction of the carbon fiber bundle by using the surface treatment apparatus 40 illustrated in FIG. 9 contacted the carbon fiber and the tension for twelve thousand single fibers was changed as illustrated in Table 1. The result is illustrated in Table 1.

Furthermore, the reference numeral "14c" of FIG. 9 indicates the third free roll. Further, in FIG. 9, the same reference numerals will be given to the same components as those of FIG. 1, and the description thereof will not be repeated.

Comparative Example 3

Various measurements and evaluations were performed on the untreated carbon fiber as in Example 1. The result is illustrated in Table 1.

Reference Example 1

An electrolytic oxidation treatment method was performed at 30 coulomb/g in 8 mass % of a nitric acid aqueous solution by using the untreated carbon fiber as a positive electrode. Subsequently, the nitric acid aqueous solution was removed by a cleaning treatment using pure water, the carbon fiber was dried at 400° C. for 0.5 minutes, and a sizing treatment was performed on the carbon fiber, thereby obtaining the carbon fiber subjected to the surface treatment.

Various measurements and evaluations were performed on the carbon fiber subjected to the surface treatment as in Example 1. The result is illustrated in Table 1.

Reference Example 2

A flame-resistant fiber bundle was obtained by performing a heating treatment on an acrylic fiber of which the single fiber fineness was 1.2 dtex and the number of single fibers was 6000 at the stretching rate of −6.0% and the temperature of 220° C. to 260° C. until the flame-resistant treatment ended. Then, an untreated carbon fiber was obtained by performing a precarbonizing treatment on the flame-resistant fiber bundle in a nitrogen atmosphere of 700° C. at the stretching rate of +3% and performing a carbonizing treatment thereon in a nitrogen atmosphere of 1250° C. at the stretching rate of −4.2%.

The carbon fiber surface treatment was performed as in Comparative Example 1 except that the obtained untreated carbon fiber was used. Various measurements and evaluations were performed on the obtained carbon fiber as in Example 1. The result is illustrated in Table 1.

TABLE 1

|  | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| TRANSPORTATION SPEED [m/MINUTE] OF CARBON FIBER | 3 | 3 | 3 | 3 | 8 | 8 | 8 |
| OZONE CONCENTRATION [mg/L] | 30 | 30 | 30 | 30 | 30 | 30 | 30 |
| NUMBER OF SINGLE FIBERS [UNIT] | 12000 | 12000 | 12000 | 60000 | 12000 | 12000 | 12000 |
| MOVEMENT DIRECTION OF OZONE SOLUTION WITH RESPECT TO TRANSPORTATION DIRECTION OF CARBON FIBER | PERPENDICULAR | PERPENDICULAR | PERPENDICULAR | PERPENDICULAR | PERPENDICULAR | PERPENDICULAR | PERPENDICULAR |
| SURFACE TREATMENT APPARATUS | FIG. 1 | FIG. 1 | FIG. 1 | FIG. 1 | FIG. 4 | FIG. 7 | FIG. 8 |
| CONTACT TIMES [TIMES] OF OZONE SOLUTION | 4 | 4 | 4 | 4 | 4 | 2 | 2 |
| EJECTION SPEED [m/SECOND] OF OZONE SOLUTION | 0.42 | 0.42 | 0.42 | 0.42 | 0.42 | 0.42 | 0.42 |
| TENSILE FORCE [kg] FOR TWELVE THOUSAND SINGLE FIBERS | 0.4 | 1.0 | 1.5 | 0.4 | 0.4 | 0.4 | 0.4 |
| OZONE SOLUTION EJECTION AMOUNT [TIMES] WITH RESPECT TO MASS OF CARBON FIBER BUNDLE | 208 | 208 | 208 | 52 | 78 | 40 | 40 |
| LENGTH [mm] OF RECTIFYING PLATE | — | — | — | — | 300 | 300 | 300 |
| HOLDING TIME (SECOND) | 45 | 45 | 45 | 45 | 2.3 | 1.2 | 1.2 |
| MOISTURE CONTENT (%) | 100 | 100 | 100 | 100 | 0 | 0 | 0 |
| PERMEATION RESISTANCE (SECOND) | 800 | 800 | 800 | 800 | 200 | 200 | 200 |
| STRAND STRENGTH [MPa] | 4949 | 4949 | 5018 | 5018 | 4928 | 4930 | 4950 |
| STRAND MODULUS [GPa] | 241 | 242 | 241 | 250 | 241 | 243 | 244 |
| ipa VALUE [μA/cm$^2$] | 0.13 | 0.12 | 0.10 | 0.13 | 0.11 | 0.13 | 0.13 |
| BENDING STRENGTH (FS90°) [MPa] | 129 | 101 | 87.4 | 85.9 | 118 | 116 | 114 |

|  | COMPARATIVE EXAMPLE 1 | COMPARATIVE EXAMPLE 2 | COMPARATIVE EXAMPLE 3 | REFERENCE EXAMPLE 1 | REFERENCE EXAMPLE 2 |
|---|---|---|---|---|---|
| TRANSPORTATION SPEED [m/MINUTE] OF CARBON FIBER | 3 | 3 | — | 3 | 3 |
| OZONE CONCENTRATION [mg/L] | 30 | 30 | — | — | 30 |
| NUMBER OF SINGLE FIBERS [UNIT] | 12000 | 12000 | 12000 | 12000 | 6000 |
| MOVEMENT DIRECTION OF OZONE SOLUTION WITH RESPECT TO TRANSPORTATION DIRECTION OF CARBON FIBER | PARALLEL | PARALLEL | — | — | PARALLEL |
| SURFACE TREATMENT APPARATUS | FIG. 9 | FIG. 9 | — | — | FIG. 9 |
| CONTACT TIMES [TIMES] OF OZONE SOLUTION | — | — | — | — | — |

TABLE 1-continued

|  | | | | | |
|---|---|---|---|---|---|
| EJECTION SPEED [m/SECOND] OF OZONE SOLUTION | — | — | — | — | — |
| TENSILE FORCE [kg] FOR TWELVE THOUSAND SINGLE FIBERS | 0.4 | 1.5 | — | 0.4 | 0.4 |
| OZONE SOLUTION EJECTION AMOUNT [TIMES] WITH RESPECT TO MASS OF CARBON FIBER BUNDLE | — | — | — | — | — |
| LENGTH [mm] OF RECTIFYING PLATE | — | — | — | — | — |
| HOLDING TIME (SECOND) | 45 | 45 | — | — | 45 |
| MOISTURE CONTENT (%) | 100 | 100 | — | — | 100 |
| PERMEATION RESISTANCE (SECOND) | 800 | 800 | — | — | 800 |
| STRAND STRENGTH [MPa] | 5000 | 4880 | 4694 | 5067 | 4077 |
| STRAND MODULUS [GPa] | 241 | 242 | 240 | 242 | 245 |
| ipa VALUE [μA/cm$^2$] | 0.08 | 0.08 | 0.02 | 0.59 | 0.12 |
| BENDING STRENGTH (FS90°) [MPa] | 76.0 | 75.7 | 75.0 | 122 | 113 |

As apparent from Table 1, in the respective carbon fibers subjected to the surface treatment of Examples 1 to 7, the ipa values increased compared to the respective carbon fibers subjected to the surface treatment in Comparative Examples 1 and 2 or the untreated carbon fiber (Comparative Example 3). This means that the surface treatment of the carbon fiber is sufficiently performed. Further, it is proved that the value of the bending strength is high and the adhesiveness with respect to the matrix resin is improved when the carbon fiber is used as a composite material.

Further, in the carbon fiber subjected to the surface treatment of Example 5, the ipa value or the bending strength equal to that of the carbon fiber subjected to the surface treatment of Example 1 was obtained. From this result, it is proved that the sufficient surface treatment may be obtained even in a condition in which the treatment speed (that is, the transportation speed of the carbon fiber bundle) is increased to improve the productivity when the rectifying plate is installed.

Further, in a case of Example 6, the carbon fiber bundle was sampled immediately after the carbon fiber bundle passed through the air blower, and the moisture content and the permeation resistance were measured. As the measurement, the moisture content was 35%, and the permeation resistance was 410 seconds.

Meanwhile, in a case of Example 7, the carbon fiber bundle was sampled immediately after the carbon fiber bundle passed through the nip roll, and the moisture content and the permeation resistance were measured. As the measurement, the moisture content was 20%, and the permeation resistance was 310 seconds.

In this way, when the extra ozone solution is removed from the carbon fiber bundle by using the air blower or the nip roll before the ozone solution contacts the carbon fiber bundle by the second ejection, it is possible to obtain the same surface treatment effect as that of Example 5 in which the number of contact times is four times. From this result, it is proved that the carbon fiber surface treatment may be efficiently performed by controlling the moisture content or the permeation resistance of the carbon fiber bundle subjected to the surface treatment.

On the contrary, in the carbon fibers of Comparative Examples 1 and 2 in which the ozone solution moving in a direction parallel to the transportation direction of the carbon fiber bundle contacted the carbon fiber so as to perform the surface treatment thereon, the ipa values were lower than those of Examples 1 to 7. Further, the bending strength was low, and the adhesiveness with respect to the matrix resin was degraded. It is considered that the surface treatment is not sufficiently performed due to the ozone solution hardly dispersed into the carbon fiber bundle 13.

Furthermore, Reference Example 2 indicates an example in which the ozone solution moving in a direction parallel to the transportation direction of the carbon fiber bundle contacts the carbon fiber so as to perform the surface treatment thereon, but since the number of the single fibers is small so as to be 6000, the ipa value or the bending strength is higher than those of Comparative Examples 1 and 2. However, as apparent from the results of Comparative Examples 1 and 2, the method of causing the ozone solution moving in a direction parallel to the transportation direction of the carbon fiber bundle to contact the carbon fiber so as to perform the surface treatment thereon is not appropriate for the case where the surface treatment is performed on the carbon fiber bundle having ten thousand single fibers.

From the above-described result, in the invention, it is proved that the same surface treatment effect as that of the case where the surface treatment is performed by the existing electrolytic oxidation treatment method (Reference Example 1) may be obtained. Thus, in the invention, since the carbon fiber having excellent adhesiveness with respect to the matrix resin may be obtained and the cleaning process is not needed, the manufacturing cost may be reduced compared to the existing method.

Further, the invention is particularly appropriate for the case where the surface treatment is performed on the carbon fiber bundle having many single fibers (specifically, ten thousand or more single fibers).

Examples 8 to 18

The ipa value was measured by performing the carbon fiber surface treatment as in Example 1 except that the surface treatment apparatus 20 illustrated in FIG. 3 was used, the ozone treatment tank 12 was not filled with the ozone solution 11, the carbon fiber bundle 13 was not immersed into the ozone solution 11, and the conditions of the ozone concentration, the number of the single fibers of the carbon fiber bundle subjected to the surface treatment, the transportation speed of the carbon fiber bundle, the number of contact times (that is, the number of the branch pipes 15b), the ejection speed of the ozone solution 11, the tension for twelve thousand single fibers, the ejection amount of the ozone solution 11 per unit time with respect to the mass of the carbon fiber bundle 13 passing above the fluid ejecting port 15c per unit time, and the time (holding time) for holding the carbon fiber bundle 13 inside the ozone solution 11 were changed as illustrated in Table 2. The result is illustrated in Table 2.

Furthermore, in a case where the surface treatment is performed on the carbon fiber bundle 13 by using the surface treatment apparatus 20 illustrated in FIG. 3, the contact time of the carbon fiber bundle 13 with respect to the ozone solution 11 indicates the sum of the time in which the ozone solution 11 ejected from the fluid ejecting port 15c of each branch pipe 15b contacts the carbon fiber bundle 13.

As apparent from Table 2, even when the carbon fiber was not immersed into the ozone solution, the ipa values of the respective carbon fibers subjected to the surface treatment in Examples 8 to 18 increased compared to the respective carbon fibers subjected to the surface treatment of Comparative Examples 1 and 2 or the untreated carbon fiber (Comparative Example 3). This means that the surface treatment of the carbon fiber is sufficiently performed.

Furthermore, in Examples 8 to 18, the carbon fiber bundle immediately before the contact of the ozone solution with respect to the carbon fiber bundle by the ejection from the fluid ejecting port located at the most downstream side was sampled, and the moisture content and the permeation

TABLE 2

| | EXAMPLE 8 | EXAMPLE 9 | EXAMPLE 10 | EXAMPLE 11 | EXAMPLE 12 | EXAMPLE 13 |
|---|---|---|---|---|---|---|
| TRANSPORTATION SPEED [m/MINUTE] OF CARBON FIBER | 2 | 2 | 2 | 2 | 2 | 2 |
| OZONE CONCENTRATION [mg/L] | 30 | 30 | 30 | 30 | 30 | 30 |
| NUMBER OF SINGLE FIBERS [UNIT] | 12000 | 12000 | 12000 | 12000 | 12000 | 12000 |
| MOVEMENT DIRECTION OF OZONE SOLUTION WITH RESPECT TO TRANSPORTATION DIRECTION OF CARBON FIBER | PERPEN-DICULAR | PERPEN-DICULAR | PERPEN-DICULAR | PERPEN-DICULAR | PERPEN-DICULAR | PERPEN-DICULAR |
| SURFACE TREATMENT APPARATUS | FIG. 3 | FIG. 3 | FIG. 3 | FIG. 3 | FIG. 3 | FIG. 3 |
| CONTACT TIMES [TIMES] OF OZONE SOLUTION | 4 | 2 | 1 | 2 | 4 | 2 |
| EJECTION SPEED [m/SECOND] OF OZONE SOLUTION | 0.93 | 0.93 | 0.93 | 1.85 | 0.23 | 0.23 |
| TENSILE FORCE [kg] FOR TWELVE THOUSAND SINGLE FIBERS | 0.5 | 0.5 | 0.5 | 0.5 | 0.5 | 0.5 |
| OZONE SOLUTION EJECTION AMOUNT [TIMES] WITH RESPECT TO MASS OF CARBON FIBER BUNDLE | 300 | 156 | 78 | 156 | 78 | 40 |
| HOLDING TIME (SECOND) | 9.6 | 4.8 | 2.3 | 4.8 | 9.6 | 4.8 |
| ipa VALUE [μA/cm$^2$] | 0.12 | 0.12 | 0.12 | 0.13 | 0.11 | 0.10 |

| | EXAMPLE 14 | EXAMPLE 15 | EXAMPLE 16 | EXAMPLE 17 | EXAMPLE 18 |
|---|---|---|---|---|---|
| TRANSPORTATION SPEED [m/MINUTE] OF CARBON FIBER | 2 | 2 | 2 | 2 | 2 |
| OZONE CONCENTRATION [mg/L] | 41 | 20 | 13 | 30 | 30 |
| NUMBER OF SINGLE FIBERS [UNIT] | 12000 | 12000 | 12000 | 18000 | 24000 |
| MOVEMENT DIRECTION OF OZONE SOLUTION WITH RESPECT TO TRANSPORTATION DIRECTION OF CARBON FIBER | PERPEN-DICULAR | PERPEN-DICULAR | PERPEN-DICULAR | PERPEN-DICULAR | PERPEN-DICULAR |
| SURFACE TREATMENT APPARATUS | FIG. 3 | FIG. 3 | FIG. 3 | FIG. 3 | FIG. 3 |
| CONTACT TIMES [TIMES] OF OZONE SOLUTION | 4 | 4 | 4 | 4 | 4 |
| EJECTION SPEED [m/SECOND] OF OZONE SOLUTION | 0.43 | 0.43 | 0.43 | 0.43 | 0.43 |
| TENSILE FORCE [kg] FOR TWELVE THOUSAND SINGLE FIBERS | 0.5 | 0.5 | 0.5 | 0.5 | 0.5 |
| OZONE SOLUTION EJECTION AMOUNT [TIMES] WITH RESPECT TO MASS OF CARBON FIBER BUNDLE | 156 | 156 | 156 | 156 | 156 |
| HOLDING TIME (SECOND) | 9.6 | 9.6 | 9.6 | 9.6 | 9.6 |
| ipa VALUE [μA/cm$^2$] | 0.14 | 0.12 | 0.11 | 0.14 | 0.16 | resistance were measured. In any case, the moisture content was 0%, and the permeation resistance was 200 seconds.

INDUSTRIAL APPLICABILITY

According to the carbon fiber manufacturing method of the invention, it is possible to obtain a carbon fiber having excellent adhesiveness with respect to a matrix resin.

Further, the carbon fiber of the invention has excellent adhesiveness with respect to a matrix resin.

EXPLANATIONS OF LETTERS OR NUMERALS 10, 20, 30, 40 surface treatment apparatus
11 ozone solution
12 ozone treatment tank
13 carbon fiber bundle
14a first free roll
14b second free roll
14c third free roll
15 contact member
15a pipe
15b branch pipe
15c fluid ejecting port
15d rectifying plate
151d hole
152d bottom plate
153d side plate
15e collision plate
16 circulation pump
16a suction pipe
17 air blower
18 nip roll
F movement direction of ozone solution.

The invention claimed is:

1. A carbon fiber manufacturing method comprising:
a surface treatment step of ejecting an ozone solution in which ozone is dissolved in solvent from a fluid ejecting port toward a carbon fiber bundle and causing the ozone solution to pass between single fibers of the carbon fiber bundle so as to contact surfaces of the single fibers so that the surfaces of carbon fibers are treated by the ozone solution,
wherein:
the carbon fiber bundle comprises 10000 to 60000 single fibers, and
the ozone solution is ejected at an ejection speed set to 0.20 m/second to 2.0 m/second in a direction intersecting the transportation direction of the transported carbon fiber bundle from the fluid ejecting port.

2. The carbon fiber manufacturing method according to claim 1,
wherein a tension of the carbon fiber bundle measured when the ozone solution contacts surfaces of single fibers is 0.3 kgf to 1.8 kgf for twelve thousand single fibers.

3. The carbon fiber manufacturing method according to claim 1 or 2,
wherein the carbon fiber bundle is held inside the ozone solution for 0.1 seconds to 60 seconds.

4. The carbon fiber manufacturing method according to claim 1 or 2,
wherein, an ejection amount of the ozone solution per unit time is set to forty times to three hundred times with respect to a mass of the carbon fiber bundle passing above the fluid ejecting port or below the fluid ejecting port per unit time.

5. The carbon fiber manufacturing method according to claim 1 or 2,
wherein the number of times of ejecting the ozone solution from the fluid ejecting port toward the carbon fiber bundle so as to contact the surfaces of the single fibers is set to one to four times.

6. The carbon fiber manufacturing method according to claim 1 or 2,
wherein the fluid ejecting port has a rectangular shape, the length direction of the fluid ejecting port is the width direction of the carbon fiber bundle, and a length of the fluid ejecting port in the length direction is equal to or larger than a width of the carbon fiber bundle.

7. The carbon fiber manufacturing method according to claim 1 or 2,
wherein a collision plate is installed at a position facing the fluid ejecting port by interposing the carbon fiber bundle transported above a liquid level of an ozone treatment tank storing the ozone solution, and the ozone solution ejected from the fluid ejecting port is caused to pass between the single fibers of the carbon fiber bundle so as to collide with the collision plate.

8. The carbon fiber manufacturing method according to claim 7,
wherein the surface treatment is performed on the carbon fiber bundle of which the permeation resistance measured based on JIS P 8117:2009 is 100 seconds to 700 seconds and which is transported above the liquid level of the ozone treatment tank storing the ozone solution.

9. The carbon fiber manufacturing method according to claim 7,
wherein the surface treatment is performed on the carbon fiber bundle of which the moisture content is 40% or less and which is transported above the liquid level of the ozone treatment tank storing the ozone solution.

10. The carbon fiber manufacturing method according to claim 1 or 2,
wherein the surface treatment is performed on the carbon fiber bundle transported inside the ozone solution.

11. The carbon fiber manufacturing method according to claim 1 or 2,
wherein an ozone concentration of the ozone solution is 10 mg/L to 120 mg/L.

12. The carbon fiber manufacturing method according to claim 1 or 2,
wherein a carbon fiber is obtained of which a current value (ipa value) per unit area measured by a cyclic voltammetry method is 0.10 $\mu A/cm^2$ or more.

* * * * *